Jan. 2, 1962   E. A. ZARATKIEWICZ ET AL   3,015,591
SEMI-CONDUCTOR RECTIFIERS AND METHOD OF MANUFACTURE
Filed July 18, 1958                         3 Sheets-Sheet 2
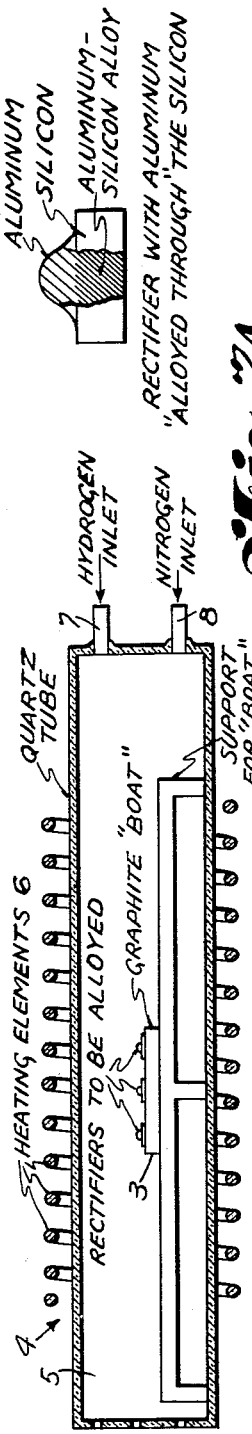
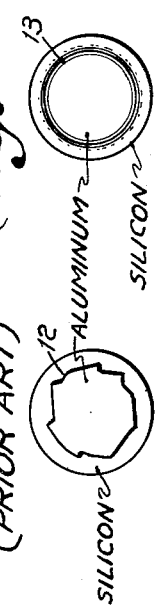
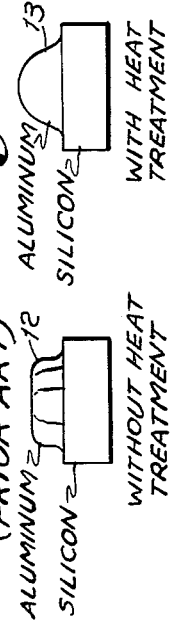
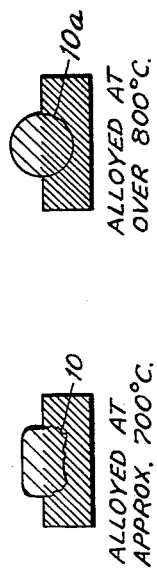
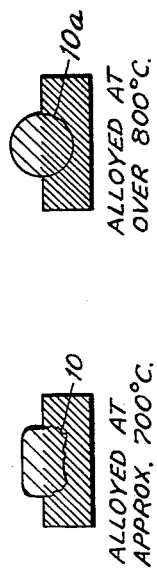
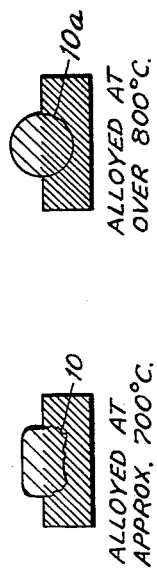
Inventors
EDWIN A. ZARATKIEWICZ
EDWARD J. SMITH
By Alfred C. Hill
Agent Jan. 2, 1962   E. A. ZARATKIEWICZ ET AL   3,015,591
SEMI-CONDUCTOR RECTIFIERS AND METHOD OF MANUFACTURE
Filed July 18, 1958   3 Sheets-Sheet 3

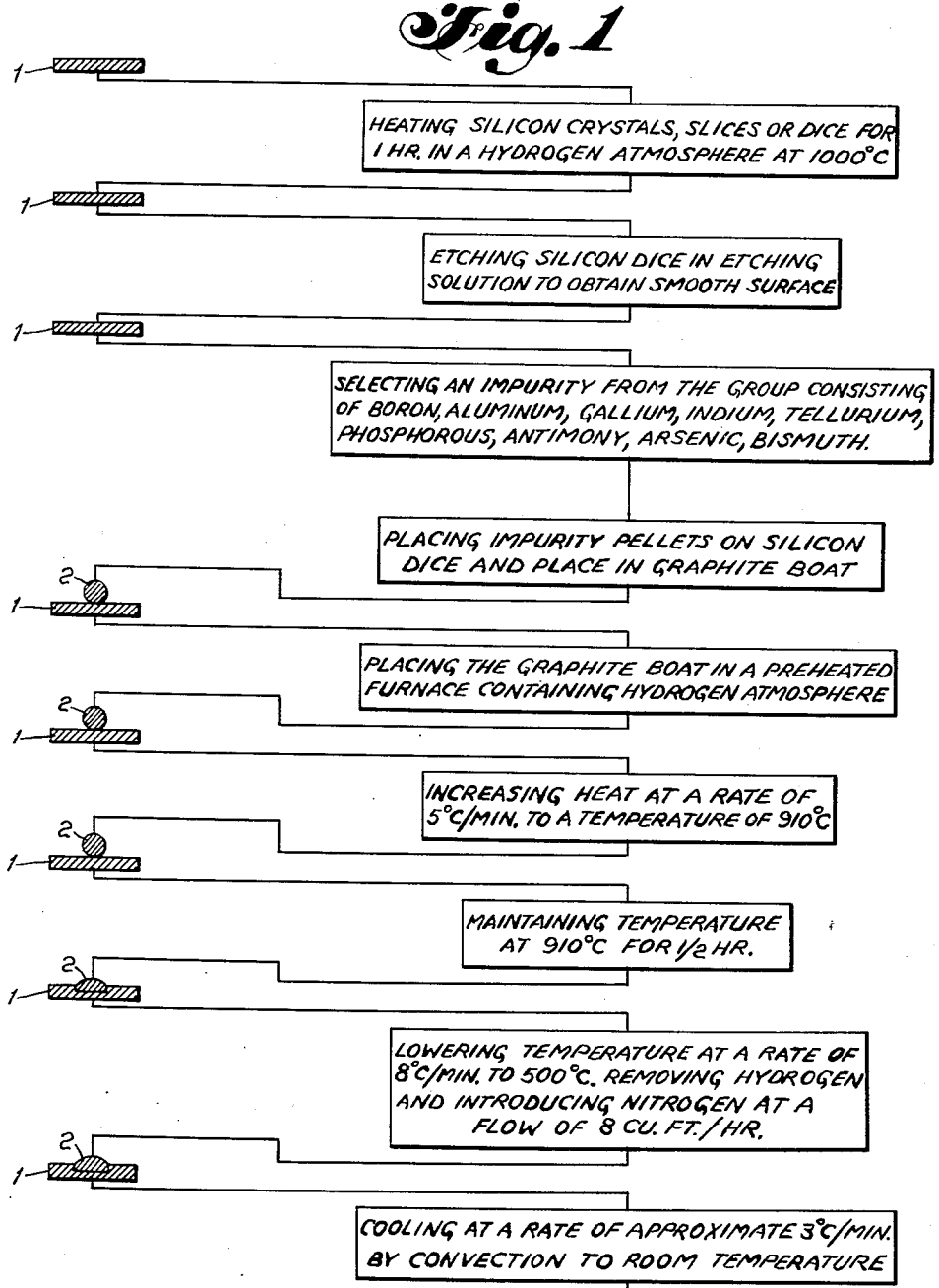

Fig. 3 (PRIOR ART)

RECTIFIERS MADE WITHOUT
HEAT TREATMENT PROCESS

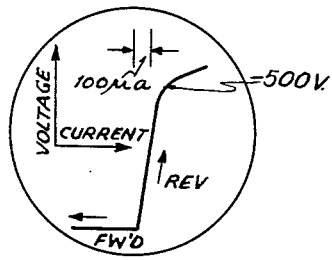

REVERSE CHARACTERISTICS
AT ROOM TEMPERATURE

Fig. 4

RECTIFIERS MADE WITH
HEAT TREATMENT PROCESS

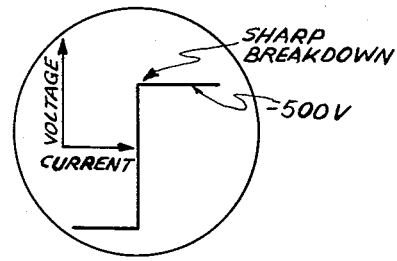

REVERSE CHARACTERISTICS
AT ROOM TEMPERATURE

Fig. 3A (PRIOR ART)

RECTIFIERS MADE WITHOUT
HEAT TREATMENT PROCESS

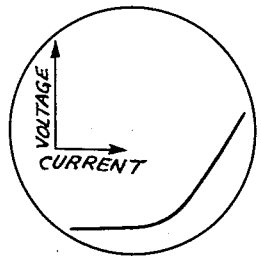

REVERSE CHARACTERISTICS
AT 125° C.

Fig. 4A

RECTIFIERS MADE WITH
HEAT TREATMENT PROCESS

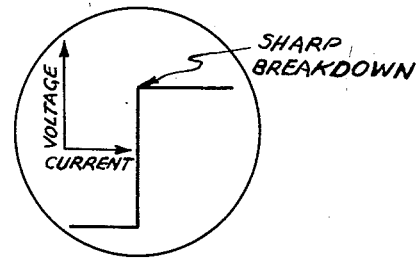

REVERSE CHARACTERISTCS
AT 125°

Inventors
EDWIN A. ZARATKIEWICZ
EDWARD J. SMITH
By Alfred C. Hill
Agent

United States Patent Office 3,015,591
Patented Jan. 2, 1962

3,015,591
SEMI-CONDUCTOR RECTIFIERS AND METHOD OF MANUFACTURE
Edwin A. Zaratkiewicz, South Amboy, and Edward J. Smith, Lyndhurst, N.J., assignors to International Telephone and Telegraph Corporation, Nutley, N.J., a corporation of Maryland
Filed July 18, 1958, Ser. No. 749,513
15 Claims. (Cl. 148—1.5)

This invention relates to electrical rectifiers and more particularly to semi-conductor rectifiers and methods of manufacturing the same.

In the fabrication of semi-conductor rectifiers and other semi-conductor devices, it has been the practice in the past to form a rectifying junction by introducing an impurity of opposite conductivity type into the host material. The host material is one of the class of materials known as semi-conductors. If, for instance, the conductivity type of the host material is n, an impurity from group III of the periodic table, such as aluminum, gallium or indium, is introduced. If, on the other hand, the host material is of a p-type conductivity, an impurity from group V of the periodic table, such as antimony or arsenic, is used. The rectifying junction is usually affected by permitting the impurity to alloy into the semi-conductor following a predetermined heating and cooling cycle.

After alloying to form the rectifying junction, it is usually necessary to chemically etch away the region around the periphery of the junction in order to obtain desired low reverse leakage current at relatively high reverse voltages. The etching is then followed by a washing step to remove all trace of the etchant. By following this procedure, a relatively high yield is obtainable. However, while these devices provide acceptable reverse voltage leakage currents at room temperature, they are rarely found operable at temperature levels in the order of 100° C. Further, careful control of the process is necessary, but in spite of all measures, a relatively high proportion of these rectifiers "alloy through" or else poor junctions due to poor wetting of the alloying material with the semi-conductor result. If is, therefore, apparent that the art is in need of a method which will increase the yield of usable rectifiers and which will provide a rectifier which is operable at temperatures in the 100° C. temperature range. This latter requirement assumes great importance in view of the high temperature environments in which present and future components will be required to operate.

It is, therefore, an object of this invention to produce semi-conductor rectifiers having improved blocking voltage and reverse leakage current characteristics both at room temperature and at temperatures in excess of 100° C. which are measurably better than obtained by manufacturing processes heretofore practiced.

Another object of this invention is to provide an improved method of producing semi-conductor rectifiers wherein not only the blocking voltage and reverse leakage current are greatly improved but improved junctions between the semi-conductor and the alloying metal are also obtained.

Still another object is to provide a more efficient rectifier than obtained heretofore, and a further object is to provide a manufacturing method which eliminates certain steps now considered necessary in the manufacture of semiconductor rectifiers.

One of the features of this invention is the method of making a semi-conductor device which comprises the steps of heat-treating a semi-conductor at an elevated temperature sufficient to remove impurities from said semi-conductor, selecting an impurity from the group consisting of boron, aluminum, gallium, indium, tellurium, phosphorous, antimony, arsenic, and bismuth, alloying said impurity with said semi-conductor at a given temperature and cooling said alloyed semi-conductor device to room temperature.

Another feature of this invention is the utilization of a nitrogen atmosphere during part of the cooling cycle to permit the formation of nitrides which eliminates the prior art steps of etching and washing after alloying.

A further feature of this invention is the utilization of relatively high alloying temperatures which permits enhanced wetting of the semi-conductor by the alloying impurity and leads to the formation of "planar junctions" after alloying.

The above-mentioned and other features and objects of this invention and the manner of attaining them will become more apparent by reference to the description taken in conjunction with the accompanying drawings, wherein:

FIG. 1 is a diagrammatical illustration of a flow chart showing specimens, in exaggerated proportion for purposes of illustration, at different stages in the process of manufacturing a silicon rectifier in accordance with the principles of this invention;

FIG. 2 is a partial longitudinal cross-sectional sketch of a type of furnace suitable in manufacturing rectifiers in accordance with the principles of this invention;

FIGS. 3 and 3A illustrate oscilloscope displays of the reverse characteristics of a silicon rectifier at room temperature and at 125° C., respectively, using prior art techniques;

FIGS. 4 and 4A illustrate oscilloscope displays of the reverse characteristics of a silicon rectifier using the method of the present invention at room temperature and at 125° C., respectively;

FIG. 5 is a cross-sectional representation of a prior art silicon rectifier which has "alloyed through";

FIG. 6A is a cross-sectional representation of a silicon rectifier which has been alloyed at approximately 700° C. using the non-heat-treated silicon of the prior art;

FIG. 6B is a cross-sectional representation of a silicon rectifier which has been alloyed at a temperature of over 800° C. using non-heat-treated silicon of the prior art;

FIG. 6C is a cross-sectional representation of a silicon rectifier which has been alloyed at a temperature in accordance with the principles of this invention employing heat-treated silicon;

FIG. 7A is a top view and FIG. 7B is a side view of a silicon rectifier which shows the wetting of silicon by aluminum using prior art techniques; and FIG. 7C is a top and FIG. 7D is a side view of a silicon rectifier which shows the wetting of silicon by aluminum using the technique of the present invention.

Referring to FIG. 1, there is shown therein an illustration of a flow chart showing a silicon rectifier at different stages in the process of its manufacture in accordance with the principles of this invention. In the following process, semi-conductor crystals, such as silicon and germanium for instance, are cut into slices or dice prior to the first step in this manufacturing process. Thus, in FIG. 1, a semi-conductor material 1 which may be in the form of a crystal, slices or dice is introduced into a furnace such as shown in FIG. 2 and heated in a hydrogen atmosphere at 1000° C. for one hour. This heat-treatment is carried out to reduce impurities from the bulk of the semi-conductor material. The result of this heat-treating step is an increase in the resistivity of the semi-conductor. This increase in resistivity is indicative of a removal of undesirable impurities.

In the steps which follow, the semi-conductor material used will be silicon. This material should be considered as being applicable to the preferred embodiment of this invention and not as a limitation to the scope of the invention as described herein. Other useful semi-conductors will be indicated in a paragraph devoted to that subject.

In the next operation, the silicon dice are etched in an etching solution, well known to those skilled in the art, to obtain a smooth surface. It is not necessary to perform this step to obtain an improved rectifier in accordance with the principles of this invention. However, it has been found that better results are obtained when the semi-conductor being used is etched. In order to form a rectifying junction, an impurity must be alloyed with the semi-conductor surface. If the semi-conductor material is n type, an impurity is selected from group III of the periodic table, and if the semi-conductor is p type, an impurity is selected from group V of the periodic table. An impurity 2 is, therefore, selected from the group consisting of boron, aluminum, gallium, indium, tellurium, phosphorous, antimony, arsenic and bismuth for alloying in a furnace with the silicon. Other impurities well known in the art, such as aluminum-tin alloy, may be used to obtain a rectifier in accordance with the principles of this invention.

Referring to FIG. 2, the impurities, in the form of pellets, are then placed on the silicon dice in a graphite "boat" 3 and placed in a furnace 4 which has been preheated to 100° C. The graphite "boat" 3 may be placed in the furnace at room temperature, but it has been found that preheating the furnace to 100° C. shortens the time of this process.

In FIG. 2, the furnace 4 is a conventional type consisting of a quartz tube 5 which is surrounded by electrical heating elements 6 which provide a uniform temperature over the length of the quartz tube. Suitable fixtures 7, 8 are provided to provide inlets for gases in accordance with the teaching of this invention. Thus, in FIG. 2, hydrogen is caused to flow through the furnace from inlet 7 at a rate of 8 cubic ft. per hour. Returning to FIG. 1, the temperature of the oven is then increased at a rate of 5° C. per minute to a temperature of 910° C. This temperature is then maintained for one-half hour in order to obtain proper alloying of the impurity with the silicon material. At the end of the half-hour period, cooling is started at a rate of 8° C. per minute until a temperature of 500° C. is reached. At this point, the hydrogen atmosphere is removed and nitrogen is introduced at inlet 8, in FIG. 2, at a flow rate of 8 cubic ft. per hour. Finally, the oven is allowed to cool by convection to room temperature at a rate of approximately 3° C. per minute and a rectifying junction 9 in accordance with the principles of this invention results.

It has been found in the production of this rectifier that an improved rectifier may also be obtained by carrying on the heat-treating, alloying and cooling steps in a vacuum. A further improvement, however, is obtained by utilizing hydrogen during heat-treating and by utilizing hydrogen and nitrogen atmospheres during the alloying and cooling steps, respectively, as outlined above.

Although specific temperatures and times for heat-treatment and alloying are given above, it has been found that comparable results may be obtained by heat-treating within a temperature range of 850° C. to 1300° C. for a period of time varying from 15 minutes to several days, the heating time being inversely proportional to the temperature. It has been found also that the alloying temperatures may range from 850° C. to 1000° C. and that the time of alloying may vary from several minutes to several hours without seriously affecting the characteristics of the resulting rectifier. It has been found, however, that the temperatures and time cycle in the manufacture of silicon rectifiers as originally outlined give the best results and provide the highest yield of usable silicon rectifiers.

In order to point up the contribution that this invention has made to the rectifier art, several facts taken in conjunction with the foregoing paragraphs and with FIGS. 3, 3A, 4, 4A, 5, 6A, 6B, 6C, 7A, 7B, 7C and 7D must be considered.

In conjunction with the heat treating step of the semi-conductor material, it has been pointed out that to obtain the best results this heat-treatment should be carried out in a hydrogen atmosphere. To indicate the criticalness of the use of the hydrogen atmosphere, it should be pointed out that other atmospheres such as forming gas, argon and helium have been used. The use of these atmospheres has, however, provided no improvement in the characteristics of the resulting rectifier even though the alloying and cooling steps already described have been followed. It is believed, therefore, that the use of the hydrogen atmosphere at the prescribed temperatures is critical and that the effect on the semi-conductor is to relieve internal stresses and remove impurities and dislocations.

While the process for making an improved rectifier has been described in connection with silicon as the semi-conductor material, it has been indicated that other semi-conductor material may be treated in the same manner to provide a similarly improved rectifier. Germanium, already mentioned, may be used and certain other semi-conductors known as the intermetallic compounds are amenable for use with the process of this invention. Among the intermetallic compounds the following are representative of compounds which provide a useful rectifier and include aluminum arsenide, aluminum antimonide, gallium antimonide, silicon carbide. In general, semi-conductors, such as mentioned hereinabove, may be heat-treated at a temperature in the order of approximately 100° C. below the melting point of the semi-conductor to obtain results which are in accordance with the teaching of this invention. It is apparent, of course, that the alloying temperature will be governed by the type of impurity and the type of semi-conductor being used.

It has been found that by following the steps of this process, particularly with regard to the steps for the preferred embodiment, that approximately 90% of the units can be used without etching or other surface treatment after the alloying step. The remaining rectifiers which do not provide the required characteristics may, however, be chemically etched. This etching step provides a rectifier which is similar in all respects to the unetched rectifier and by this etching step, the yield of useful rectifiers is further increased. This step forms no part of the process as described and claimed herein, but it is mentioned to indicate that salvagable rejects are obtained from this process which when salvaged exhibit the characteristics imparted by the steps in this process.

Referring to FIGS. 3 and 3A, there is shown therein a representation of oscilloscope displays of the reverse characteristics of a silicon rectifier at room temperature and at 125° C. using prior art techniques. At room temperature, the oscilloscope display of FIG. 3 indicates a reverse current of approximately 200μ amperes at 500 volts reverse voltage. At a temperature of 125° C., it may be seen in FIG. 3A that the reverse characteristics have completely deteriorated and the device has been rendered inutile.

FIGS. 4 and 4A, on the other hand, show a representation of oscilloscope displays of the reverse characteristics of a silicon rectifier at room temperature and at 125° C. which has been made in accordance with the process of this invention. At room temperature, the reverse leakage current at −500 volts proved to be substantially less than 200μ amperes. In many instances, the reverse current was less than 10μ amperes. This is the condition shown in FIG. 4. At temperatures of 125° C., the reverse leakage current, as shown in FIG. 4A, remains substantially unchanged. It will be noted that in both conditions (at room temperature and at 125° C.) the rectifiers made according to this invention exhibit the desirable "sharp breakdown" characteristic.

FIG. 5 is a cross-sectional representation of a prior art silicon rectifier which has "alloyed through." In this condition, a rectifying junction, composed of an aluminum-silicon alloy is not formed. The aluminum-silicon alloy penetrates completely through the silicon and an unusable device results.

Referring to FIG. 6A, there is shown therein a representation of a prior art silicon rectifier using non-heat treated silicon which has been alloyed at approximately 700° C. The ragged junction 10 and its non-planar appearance should be noted. In FIG. 6B, non-heat treated silicon of the prior art is alloyed with aluminum at a temperature of over 800° C. In this figure, the junction 10a is less ragged but the junction is also less "planar" than in the instance of FIG. 6A. It should be indicated, at this point, that nearly all samples of non-heat-treated silicon, when exposed to alloying temperatures above 800° C., "alloyed through."

FIGURE 6C shows a cross-sectional representation of a silicon rectifier using heat-treated silicon in accordance with this invention, which has been alloyed with aluminum at a temperature which falls within the range of from 850° C. to 1000° C. The fact that "alloying through" has not taken place at this elevated temperature should be noted. Further, a planar junction 11 has been formed. This characteristic is desirable, since junction characteristics in rectifiers and transistors are predictable by means of regular geometry. Experiments have indicated that the heat-treating in a hydrogen atmosphere of the semi-conductor results in a removal of impurities from the semi-conductor. This is indicated by an increase of resistivity of the semi-conductor after heat-treating. Further, experiments have indicated that dislocations, a cause of "alloying through," are either removed or are more uniformly distributed resulting in better alloying in the heat-treated semi-conductors.

FIGS. 7A and 7B show a top view and a side view, respectively, of a silicon rectifier which shows the wetting of silicon by aluminum using non-heat-treated silicon of the prior art. The irregular wetting of the silicon by the aluminum at 12 in FIG. 7A should be noted as opposed to the regular wetting of the silicon by aluminum at 13 in FIG. 7C wherein a heat-treated silicon sample is used. Experiments have indicated that the initial heat-treating of the semi-conductor enhances wetting of the silicon by the aluminum. Further, alloying in the hydrogen atmosphere reduces any oxides which may be present on either the semi-conductor or the impurity and better wetting results.

With respect to the elimination of the prior art etching and washing steps after alloying, it is believed that it is possible to eliminate these steps from our process due to use of the nitrogen atmosphere during part of the cooling cycle. It is believed that non-conducting nitrides are formed on the surface over the junction and it is this formation which eliminates etching.

A logical result from the improved wetting and from the formation of planar junctions is the improvement in the forward current capacity of rectifiers made according to this process. Since alloying may be carried out in a more uniform manner, larger areas may be alloyed and rectifiers having greater power handling capacity result. Efficiency of the rectifiers is also improved, since the power dissipation under reverse conditions is reduced.

In the foregoing specification, this process has been applied to the manufacture of semi-conductor rectifiers. It is not necessary, however, to limit the practice of this invention to rectifiers alone. The process described herein may be applied to multi-junction devices such as transistors by using appropriate jigging devices to position the impurities at points where junctions are to be formed.

While we have described above the principles of our invention in connection with specific apparatus, it is to be clearly understood that this description is made only by way of example and not as a limitation to the scope of our invention as set forth in the objects thereof and in the accompanying claims.

We claim:

1. In the method of making a semi-conductor device the steps comprising heat-treating a semi-conductor at an elevated temperature below the melting point of the semi-conductor in a hydrogen atmosphere sufficient to remove impurities from said semi-conductor, selecting an impurity from the group consisting of boron, aluminum, gallium, indium, tellurium, phosphorus, antimony, arsenic and bismuth, alloying said impurity with said semi-conductor at a given temperature below the melting point of said semi-conductor, and cooling said alloyed semi-conductor to room temperature.

2. In the method of making a semi-conductor device the steps comprising heat-treating a semi-conductor at an elevated temperature below the melting point of the semi-conductor in a hydrogen atmosphere sufficient to remove impurities from said semi-conductor, selecting an impurity from the group consisting of boron, aluminum, gallium, indium, tellurium, phosphorus, antimony, arsenic and bismuth, alloying said impurity with said semi-conductor in an evacuated chamber at a given temperature below the melting point of said semi-conductor, and cooling said alloyed semi-conductor to room temperature.

3. In the method of making a semi-conductor device the steps comprising heat-treating a semi-conductor at an elevated temperature below the melting point of the semi-conductor in a hydrogen atmosphere sufficient to remove impurities from said semi-conductor, selecting an impurity from the group consisting of boron, aluminum, gallium, indium, tellurium, phosphorus, antimony, arsenic and bismuth, alloying said impurity with said semi-conductor at a given temperature below the melting point of said semi-conductor in a hydrogen atmosphere and cooling said alloyed semi-conductor to room temperature in a nitrogen atmosphere.

4. In the method of making a silicon rectifier device the steps comprising heat-treating silicon at an elevated temperature below the melting point of silicon in a hydrogen atmosphere sufficient to remove impurities from said silicon, selecting an impurity from the group consisting of boron, aluminum, gallium, indium, tellurium, phosphorous, antimony, arsenic and bismuth, alloying said impurity with said silicon at a given temperature below the melting point of said silicon, and cooling said alloyed silicon to room temperature.

5. In the method of making a silicon rectifier device the steps comprising heat-treating silicon at an elevated temperature below the melting point of silicon in a hydrogen atmosphere sufficient to remove impurities from said silicon, selecting an impurity from the group consisting of boron, aluminum, gallium, indium, tellurium, phosphorous, antimony, arsenic and bismuth, alloying said impurity with said silicon in an evacuated chamber at a given temperature below the melting point of said silicon, and cooling said alloyed silicon to room temperature.

6. In the method of making a silicon rectifier device the steps comprising heat-treating silicon at an elevated temperature below the melting point of silicon in a hydrogen atmosphere sufficient to remove impurities from said silicon, selecting an impurity from the group consisting of boron, aluminum, gallium, indium, tellurium, phosphorous, antimony, arsenic and bismuth, alloying said impurity with said silicon at a given temperature below the melting point of said silicon in a hydrogen atmosphere and cooling said alloyed silicon to room temperature in a nitrogen atmosphere.

7. In the method of making a semi-conductor device, the steps comprising heat-treating a semi-conductor at an elevated temperature below the melting point of the semi-conductor in a hydrogen atmosphere sufficient to remove impurities from said semi-conductor, selecting an impurity from the group consisting of boron, aluminum, gallium, indium, tellurium, phosphorous, antimony, arsenic and bismuth, placing said semi-conductor with pellets of impurity material disposed thereon in a graphite boat, placing the graphite boat in a furnace, increasing the temperature of said furnace at a given rate to a temperature below the melting point of said semi-conductor but sufficient to permit proper alloying of said impurity with said semi-conductor, maintaining said alloying temperature for a given length of time and cooling from said alloying temperature at a given rate to room temperature.

8. In the method of making a semi-conductor device, the steps comprising heat-treating a semi-conductor in a hydrogen atmosphere at an elevated temperature below the melting point of the semi-conductor sufficient to remove impurities from said semi-conductor, selecting an impurity from the group consisting of boron, aluminum, gallium, indium, tellurium, phosphorous, antimony, arsenic and bismuth, placing said semi-conductor with pellets of impurity material disposed thereon in a graphite boat, placing the graphite boat in an evacuated chamber in a furnace, increasing the temperature of said furnace at a given rate to a temperature below the melting point of said semi-conductor but sufficient to permit proper alloying of said impurity with said semi-conductor, maintaining said alloying temperature for a given length of time and cooling from said alloying temperature at a given rate to room temperature.

9. In the method of making a semi-conductor device, the steps comprising heat-treating a semi-conductor in a hydrogen atmosphere at an elevated temperature below the melting point of the semi-conductor sufficient to remove impurities from said semi-conductor, selecting an impurity from a group consisting of boron, aluminum, gallium, indium, tellurium, phosphorous, antimony, arsenic and bismuth, placing said semi-conductor with pellets of impurity material disposed thereon in a graphite boat, placing the graphite boat in a hydrogen atmosphere in a furnace, increasing the temperature of said furnace at a given rate to a temperature below the melting point of said semi-conductor but sufficient to permit alloying of said impurity with said semi-conductor, maintaining said alloying temperature for a given length of time, cooling from said alloying temperature to another given temperature, removing said hydrogen atmosphere, introducing a nitrogen atmosphere and cooling from said another given temperature at a given rate to room temperature.

10. In the method of making a silicon rectifier, the steps comprising heat-treating silicon at a temperature of 1000° C. in a hydrogen atmosphere for one hour to remove impurities from said silicon, selecting an impurity from the group consisting of boron, aluminum, gallium, indium, tellurium, phosphorous, antimony, arsenic and bismuth, placing said silicon with pellets of impurity material disposed thereon in a graphite boat, placing the graphite boat in an evacuated furnace, increasing the temperature of said furnace at a rate of 5° C. per minute to a temperature of 910° C. to permit proper alloying of said impurity with said silicon, maintaining said alloying temperature for one-half hour, cooling from said alloying temperature at a rate of 3° C. per minute to room temperature.

11. In the method of making a silicon rectifier, the steps comprising heat-treating silicon at a temperature of 1000° C. for one hour in a hydrogen atmosphere to remove impurities from said silicon, selecting an impurity from the group consisting of boron, aluminum, gallium, indium, tellurium, phosphorous, antimony, arsenic and bismuth, placing said silicon with pellets of impurity material disposed thereon in a graphite boat, placing the graphite boat in a furnace in a hydrogen atmosphere, increasing the temperature of said furnace at a rate of 5° C. per minute to a temperature of 910° C. to permit proper alloying of said impurity with said silicon, maintaining said alloying temperature for one-half hour, cooling from said alloying temperature at a rate of 8° C. per minute to 500° C., removing said hydrogen atmosphere, introducing a nitrogen atmosphere and cooling from the temperature of 500° C. at a rate of 3° C. per minute to room temperature in said nitrogen atmosphere.

12. In the method of making a semi-conductor device, the steps comprising heat-treating silicon at a temperature in the range of 850° C. to 1300° C. for a period inversely proportional to the temperature in a hydrogen atmosphere to remove said impurities from said silicon, selecting an impurity from the group consisting of boron, aluminum, gallium, indium, tellurium, phosphorous, antimony, arsenic and bismuth, placing said silicon with pellets of impurity material disposed thereon in a graphite boat and placing the graphite boat in a furnace in a hydrogen atmosphere, increasing the temperature of said furnace at a rate of 5° C. per minute to a temperature with the range of from 850° C. to 1000° C. to permit proper alloying of said impurity with said semi-conductor, maintaining said alloying temperature for a period in the range of from 10 minutes to 3 hours, cooling said alloyed semi-conductor from said alloying temperature at a rate of 8° C. per minute to a temperature in the range of from 500° C. to 700° C., removing said hydrogen atmosphere, introducing a nitrogen atmosphere and cooling from said temperature in the range of from 500° C. to 700° C. at a rate of 3° C. per minute to room temperature in said nitrogen atmosphere.

13. In the method of making a semi-conductor device, the steps comprising heat-treating silicon dice at a temperature of 1000° C. for one hour in a hydrogen atmosphere to remove impurities from said silicon, etching said dice in an etching solution to obtain smooth surfaces, selecting an impurity from a group consisting of boron, aluminum, gallium, indium, tellurium, phosphorous, antimony, arsenic and bismuth, placing said silicon dice with pellets of impurity material disposed thereon in a graphite boat, placing the graphite boat in a furnace in a hydrogen atmosphere, increasing the temperature of said furnace at a rate of 5° C. per minute to a temperature of 910° C. to permit proper alloying of said impurity, maintaining said alloying temperature for one-half hour, cooling said alloyed semi-conductor from said alloying temperature at a rate of 8° C. per minute to 500° C., removing said hydrogen atmosphere, introducing a nitrogen atmosphere and cooling from 500° C. at a rate of 3° C. per minute to room temperature in said nitrogen atmosphere.

14. In the method of making a semi-conductor device, the steps comprising heat-treating a semi-conductor at an elevated temperature below the melting point of the semi-conductor in a hydrogen atmosphere sufficient to remove impurities from said semi-conductor, selecting an impurity from the group consisting of boron, aluminum, gallium, indium, tellurium, phosphorus, antimony, arsenic and bismuth, alloying said impurity with said semi-conductor at a given temperature below the melting point of said semi-conductor in a hydrogen atmosphere and cooling said alloyed semi-conductor to room temperature.

15. In the method of making a semi-conductor device, the steps comprising heat-treating a semi-conductor at an elevated temperature below the melting point of the semi-conductor sufficient to remove impurities from said semi-conductor, selecting an impurity from a group consisting of boron, aluminum, gallium, indium, tellurium, phosphorous, antimony, arsenic and bismuth, alloying said impurity with said semi-conductor at a given temperature below the melting point of said semi-conductor and cooling said alloyed semi-conductor to room temperature in a nitrogen atmosphere.

References Cited in the file of this patent

UNITED STATES PATENTS

| | | |
|---|---|---|
| 2,844,460 | Finn et al. | July 22, 1958 |
| 2,845,373 | Nelson | July 29, 1958 |
| 2,850,412 | Dawson et al. | Sept. 2, 1958 |
| 2,850,414 | Enomoto | Sept. 2, 1958 |